US010263315B2

(12) United States Patent
Okamoto

(10) Patent No.: US 10,263,315 B2
(45) Date of Patent: Apr. 16, 2019

(54) DIRECTIONAL COUPLER AND COMMUNICATION MODULE

(71) Applicant: KYOCERA Corporation, Kyoto-shi, Kyoto (JP)

(72) Inventor: Tetsuya Okamoto, Kirishima (JP)

(73) Assignee: Kyocera Corporation, Kyoto (JP)

( * ) Notice: Subject to any disclaimer, the term of this patent is extended or adjusted under 35 U.S.C. 154(b) by 44 days.

(21) Appl. No.: 15/561,080

(22) PCT Filed: May 13, 2016

(86) PCT No.: PCT/JP2016/064255
§ 371 (c)(1),
(2) Date: Sep. 25, 2017

(87) PCT Pub. No.: WO2017/013927
PCT Pub. Date: Jan. 26, 2017

(65) Prior Publication Data
US 2018/0062236 A1 Mar. 1, 2018

(30) Foreign Application Priority Data
Jul. 22, 2015 (JP) ................... 2015-144537

(51) Int. Cl.
H01P 5/18 (2006.01)
H01P 1/10 (2006.01)
H04B 3/00 (2006.01)

(52) U.S. Cl.
CPC ............ H01P 5/18 (2013.01); H01P 1/10 (2013.01); H01P 5/187 (2013.01); H04B 3/00 (2013.01)

(58) Field of Classification Search
CPC .. H01P 5/18; H01P 5/184; H01P 5/187; H01P 1/10
USPC ................. 333/101, 103–105, 109–112, 116
See application file for complete search history.

(56) References Cited

U.S. PATENT DOCUMENTS 6,759,922 B2 * 7/2004 Adar ................. H01P 5/187
333/109
7,907,032 B2 * 3/2011 Yamamoto ............... H01P 5/18
333/116
8,417,196 B2 * 4/2013 Kitching .................. H03F 3/72
455/126

(Continued)

FOREIGN PATENT DOCUMENTS

JP 5327324 B 10/2013

Primary Examiner — Dean O Takaoka
(74) Attorney, Agent, or Firm — Volpe and Koenig, P.C.

(57) ABSTRACT

A directional coupler includes a first signal transmission line disposed between a signal input terminal and a signal output terminal, a coupled line disposed between a coupled output terminal and a resistance connection terminal and electromagnetically coupled to the first signal transmission line, switching terminals connected to a switching element of an IC chip, and a second signal transmission line in which a connection state with respect to the first signal transmission line is switched in accordance with a connection switching operation between the switching terminals by the switching element. The second signal transmission line is connected in parallel to the first signal transmission line in accordance with the connection switching operation between the switching terminals by the switching element when an electric signal in a first frequency band at low frequency is input to the signal input terminal.

12 Claims, 5 Drawing Sheets

(56) References Cited

U.S. PATENT DOCUMENTS

2012/0161897 A1  6/2012  Tamaru et al.

* cited by examiner

DIRECTIONAL COUPLER AND COMMUNICATION MODULE

TECHNICAL FIELD

The present invention relates to a directional coupler that monitors an electric signal transmitted through a line, and a communication module including the directional coupler.

BACKGROUND ART

Demands for miniaturization, higher density, and cost reduction of, for example, a mobile phone apparatus and a communication apparatus used for a mobile communication are being increased. The miniaturization and higher density are realized by allowing a single component to have plural functions incorporated to thereby decrease the number of components.

Electronic components used in the communication apparatus include a filter that passes a signal in a particular frequency band from an electric signal received by an antenna, an amplifier that amplifies the electric signal, and a directional coupler (coupler) that monitors an electric signal transmitted through a line.

Japanese Patent No. 5327324 describes a directional coupler including a low-pass filter. The low-pass filter is connected to a sub line electromagnetically coupled to a main line and includes a capacitor and a coil.

Various frequency bands are used for communications in communication apparatuses. Characteristics of some components mounted in such communication apparatuses may change depending on frequencies. Thus, the components mounted need to be changed for each frequency band. The directional coupler described in Japanese Patent No. 5327324 uses an LC low-pass filter including a capacitor and a coil and reduces a change, based on a frequency, of a coupler output represented by an attenuation amount of an electric signal output from the sub line to thereby realize a directional coupler that can cope with a wide frequency band.

The directional coupler described in Japanese Patent No. 5327324 can reduce a change based on a frequency of a coupler output, but an insertion loss represented by an attenuation amount of an electric signal output from the main line may change depending on frequencies.

SUMMARY OF INVENTION

A directional coupler according to an aspect of the present invention is used in a communication module including a switching element. The directional coupler includes a signal input terminal to which an electric signal in a predetermined first frequency band and an electric signal in a predetermined second frequency band higher than the first frequency band are input, a first signal transmission line through which the electric signal input to the signal input terminal is transmitted, a signal output terminal from which the electric signal transmitted through the first signal transmission line is output, a coupled line which is electromagnetically coupled to the first signal transmission line and through which an electric signal generated by being electromagnetically coupled is transmitted, a coupled output terminal to which a first end of the coupled line is connected and from which the electric signal transmitted through the coupled line is output, a resistance connection terminal which is connected to an external terminating resistance and to which a second end of the coupled line is connected, and a second signal transmission line disposed between the signal input terminal and the signal output terminal via the switching element and electrically connected or disconnected by the switching element, the second signal transmission line being electrically connected by the switching element when the electric signal in the first frequency band is input to the signal input terminal, and the second signal transmission line being electrically disconnected by the switching element when the electric signal in the second frequency band is input to the signal input terminal.

A communication module according to another aspect of the present invention includes the directional coupler and a switching element that is disposed on the second signal transmission line and connects or disconnects the second signal transmission line, the switching element electrically connecting the second signal transmission line when the electric signal in the first frequency band is input to the signal input terminal, and the switching element electrically disconnecting the second signal transmission line when the electric signal in the second frequency band is input to the signal input terminal.

DESCRIPTION OF EMBODIMENTS

Figure 1:
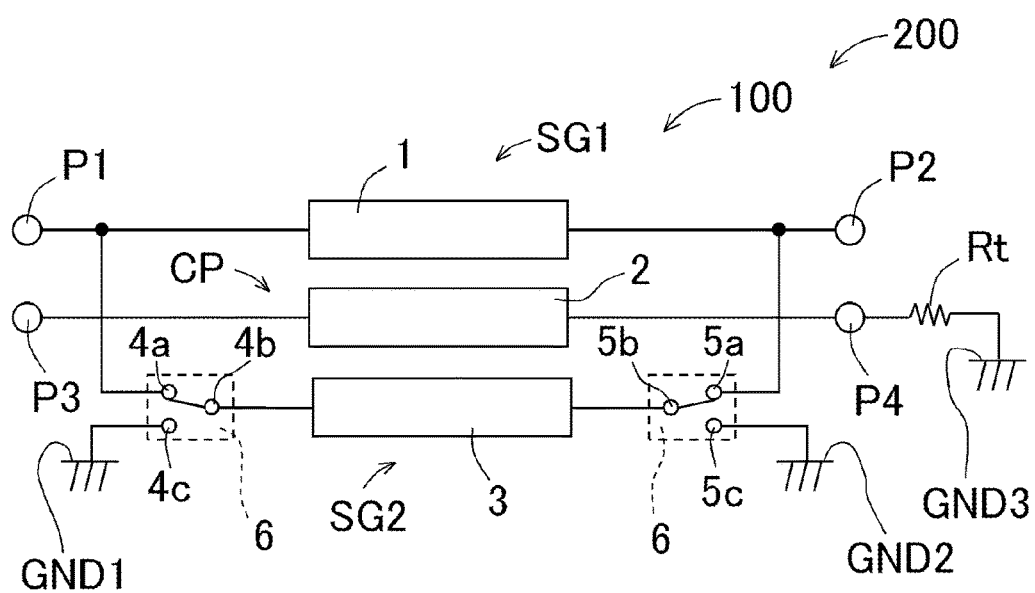
FIG. 1 is an equivalent circuit diagram of a communication module 200 including a directional coupler 100 according to a first embodiment of the present invention.
Figure 2:
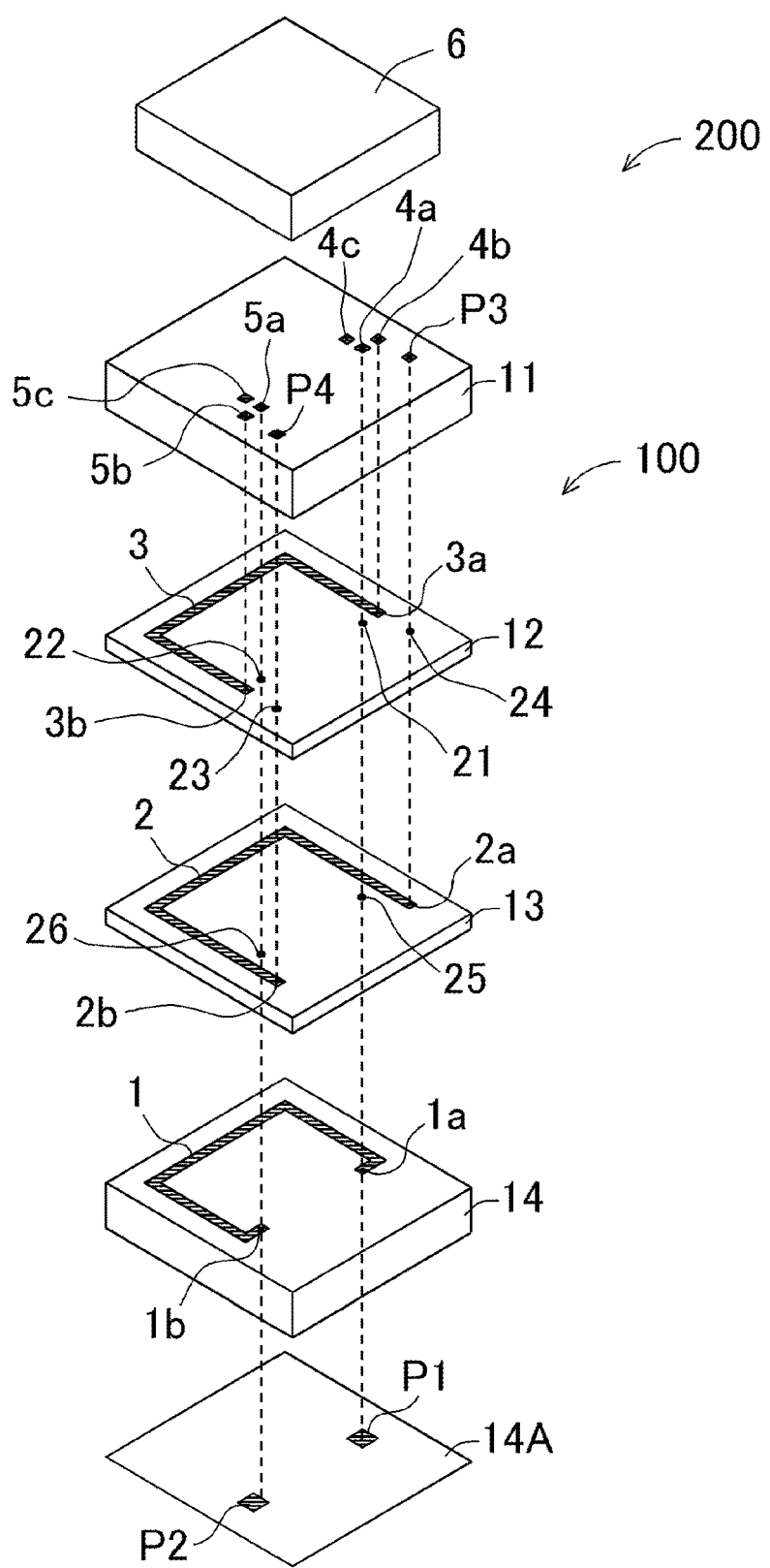
FIG. 2 is an exploded perspective view illustrating a configuration of the communication module 200.

FIG. 1 is an equivalent circuit diagram of a communication module 200 including a directional coupler 100 according to a first embodiment of the present invention, and FIG. 2 is an exploded perspective view illustrating a configuration of the communication module 200.

The communication module 200 according to the present embodiment is mounted to a mobile phone apparatus or a communication apparatus used for a mobile communication and includes the directional coupler (coupler) 100 and an integrated circuit (IC) chip 6 including a switching element.

As illustrated in FIG. 2, the directional coupler 100 includes a dielectric substrate of a stacked structure where plural dielectric layers are stacked on one another. Specifically, the dielectric substrate of the stacked structure includes a first dielectric layer 11, a second dielectric layer 12, a third dielectric layer 13, and a fourth dielectric layer 14 stacked on one another in this order from the top. Conductive patterns corresponding to terminals are disposed on external surfaces of the first dielectric layer 11 and the fourth dielectric layer 14 that are outermost layers in the directional coupler 100. Conductive patterns corresponding to signal transmission lines are disposed between the respective dielectric layers. Through conductors that electrically connect the conductive patterns corresponding to the terminals on different dielectric layers to the conductive patterns corresponding to the signal transmission lines are disposed to penetrate through the respective dielectric layers.

The first dielectric layer 11, the second dielectric layer 12, the third dielectric layer 13, and the fourth dielectric layer 14 are made of a dielectric material such as ceramics or resin, and the respective conductive patterns are made of a metal material such as tungsten or copper.

For example, a layer thickness of the first dielectric layer 11 is 35 μm, a layer thickness of the second dielectric layer 12 is 35 μm, a layer thickness of the third dielectric layer 13 is 70 μm, and a layer thickness of the fourth dielectric layer 14 is 210 μm.

The directional coupler 100 includes a first signal transmission unit SG1, a second signal transmission unit SG2, and a coupler unit CP as illustrated in the equivalent circuit of FIG. 1. Descriptions will be given of a correspondence relationship between the respective circuit elements illustrated in the equivalent circuit of FIG. 1 and the respective configurations illustrated in the exploded perspective view of FIG. 2, and also a configuration of the directional coupler 100 according to the present embodiment will be described in detail.

[First Signal Transmission Unit SG1]

First, a configuration of the first signal transmission unit SG1 will be described. The first signal transmission unit SG1 includes a signal input terminal P1, a signal output terminal P2, and a first signal transmission line 1 between those terminals.

The signal input terminal P1 is connected to, for example, an output terminal of a power amplifier and an electric signal in a predetermined first frequency band at low frequency and an electric signal in a predetermined second frequency band at frequency higher than the first frequency band are input to the signal input terminal P1. The directional coupler 100 uses a frequency band from a lowest frequency (lower limit value of the first frequency band) to a highest frequency (upper limit value of the second frequency band) of the electric signal input to the signal input terminal P1 as a frequency band for use. According to the present embodiment, since the first frequency band is 0.699 to 0.960 GHz and the second frequency band is 1.427 to 2.690 GHz for the electric signal input to the signal input terminal P1, the directional coupler 100 uses a frequency band of 0.699 to 2.690 GHz from the lower limit value 0.699 GHz of the first frequency band to the upper limit value 2.690 GHz of the second frequency band. The signal input terminal P1 is disposed on a lower surface 14A of the fourth dielectric layer 14 as illustrated in FIG. 2.

The electric signal input to the signal input terminal P1 is transmitted through the first signal transmission line 1. The first signal transmission line 1 with a predetermined length is disposed on an upper surface of the fourth dielectric layer 14 between the third dielectric layer 13 and the fourth dielectric layer 14 as illustrated in FIG. 2.

The signal output terminal P2 is connected to an antenna or the like, for example, and the electric signal transmitted through the first signal transmission line 1 is output from the signal output terminal P2 to the antenna. The signal output terminal P2 is disposed on the lower surface 14A of the fourth dielectric layer 14 as illustrated in FIG. 2.

A first end 1a of the first signal transmission line 1 is connected to the signal input terminal P1 via a through conductor penetrating through the fourth dielectric layer 14. A second end 1b of the first signal transmission line 1 is connected to the signal output terminal P2 via the through conductor penetrating through the fourth dielectric layer 14. An electric signal input from the signal input terminal P1 is transmitted from the first end 1a to the second end 1b of the first signal transmission line 1 and output from the signal output terminal P2.

[Coupler Unit CP]

Next, a configuration of the coupler unit CP will be described. The coupler unit CP includes a coupled output terminal P3, a resistance connection terminal P4, and a coupling line 2 between those terminals.

The coupling line 2 is electromagnetically coupled to the first signal transmission line 1, and an electric signal generated by the electromagnetic coupling is transmitted through the coupling line 2. The coupling line 2 is electromagnetically coupled to the first signal transmission line 1, and part of the electric signal transmitted through the first signal transmission line 1 is transmitted through the coupling line 2. The coupling line 2 with a predetermined length is disposed on an upper surface of the third dielectric layer 13 between the second dielectric layer 12 and the third dielectric layer 13 as illustrated in FIG. 2. The coupling line 2 and the first signal transmission line 1 face each other with the third dielectric layer 13 interposed between those lines and are electromagnetically coupled to each other. The coupling line 2 and the first signal transmission line 1 in the present embodiment respectively include linear conductive patterns bent in the same directions at two bending points and are overlapped with each other as viewed from a stacking direction of the dielectric layers.

A strength of the electromagnetic coupling between the coupling line 2 and the first signal transmission line 1 can be reduced when a length of one of the lines is shortened, an area of an overlapped part as viewed in the stacking direction is reduced, the coupling line 2 and the first signal transmission line 1 are shifted from each other to avoid the overlap, or a distance between the coupling line 2 and the first signal transmission line 1 is increased, that is, a thickness of the third dielectric layer 13 is thickened, for example. If the strength of the electromagnetic coupling between the coupling line 2 and the first signal transmission line 1 is changed as described above, it is possible to control a coupler output represented by an attenuation amount of the electric signal output from the coupling line 2.

The coupled output terminal P3 is connected to a first end 2a of the coupling line 2, and the electric signal transmitted through the coupling line 2 is output from the coupled output terminal P3. The electric signal output from the coupled output terminal P3 is input as a monitoring signal to an external circuit. The coupled output terminal P3 is disposed on an upper surface of the first dielectric layer 11 as illustrated in FIG. 2.

A second end 2b of the coupling line 2 is connected to the resistance connection terminal P4, and the resistance connection terminal P4 is also connected to an external terminating resistance Rt. The external terminating resistance Rt is connected to a grounding conductor electrode GND3. The resistance connection terminal P4 is disposed on the upper surface of the first dielectric layer 11 as illustrated in FIG. 2.

The first end 2a of the coupling line 2 is connected to the coupled output terminal P3 via a through conductor penetrating through the first dielectric layer 11 and a through conductor 24 penetrating through the second dielectric layer 12. The second end 2b of the coupling line 2 is connected to the resistance connection terminal P4 via the through conductor penetrating through the first dielectric layer 11 and a through conductor 23 penetrating through the second dielectric layer 12.

[Second Signal Transmission Unit SG2]

Next, a configuration of the second signal transmission unit SG2 will be described. The second signal transmission unit SG2 is disposed between the signal input terminal P1 and the signal output terminal P2 via the switching element of the IC chip 6 and includes a second signal transmission line 3 electrically connected or disconnected by the switching element. The second signal transmission line 3 is electrically connected by the switching element when the electric signal in the first frequency band at low frequency is input to the signal input terminal P1, and the second signal transmission line 3 is electrically disconnected by the switching element when the electric signal in the second frequency band at high frequency is input to the signal input terminal P1.

According to the present embodiment, the second signal transmission unit SG2 further includes a signal input connection terminal 4a, a first transmission line connection terminal 4b, a first grounding terminal 4c, a signal output connection terminal 5a, a second transmission line connection terminal 5b, and a second grounding terminal 5c which are switching element connection terminals for switching between the electric connection and disconnection of the second signal transmission line 3 by the switching element of the IC chip 6. The second signal transmission line 3 is disposed between the first transmission line connection terminal 4b and the second transmission line connection terminal 5b.

Although details will be described below, a connection state of the second signal transmission line 3 with respect to the first signal transmission line 1 is switched in accordance with operations on switching connection between respective switching terminals of the signal input connection terminal 4a, the first transmission line connection terminal 4b, the first grounding terminal 4c, the signal output connection terminal 5a, the second transmission line connection terminal 5b, and the second grounding terminal 5c by the switching element of the IC chip 6. The second signal transmission line 3 with a predetermined length is disposed on an upper surface of the second dielectric layer 12 between the first dielectric layer 11 and the second dielectric layer 12 as illustrated in FIG. 2. The second signal transmission line 3 and the coupling line 2 face each other with the second dielectric layer 12 interposed between those lines, and the second signal transmission line 3 and the coupling line 2 respectively include linear conductive patterns bent in the same directions at two bending points and are overlapped with each other as viewed from the stacking direction of the dielectric layers.

The signal input connection terminal 4a and the first transmission line connection terminal 4b are connected as a pair to the switching element of the IC chip 6 and function as a pair of first switching element connection terminals. The signal output connection terminal 5a and the second transmission line connection terminal 5b are connected as a pair to the switching element of the IC chip 6 and function as a pair of first switching element connection terminals.

The signal input connection terminal 4a is disposed on the upper surface of the first dielectric layer 11 and connected to the first end 1a of the first signal transmission line 1 via the through conductor penetrating through the first dielectric layer 11, a through conductor 21 penetrating through the second dielectric layer 12, and a through conductor 25 penetrating through the third dielectric layer 13 as illustrated in FIG. 2. The signal input connection terminal 4a is further connected to the signal input terminal P1 via the through conductor penetrating through the fourth dielectric layer 14.

The first transmission line connection terminal 4b is disposed on the upper surface of the first dielectric layer 11 and connected to a first end 3a of the second signal transmission line 3 via the through conductor penetrating through the first dielectric layer 11.

The signal output connection terminal 5a is disposed on the upper surface of the first dielectric layer 11 and connected to the second end 1b of the first signal transmission line 1 via the through conductor penetrating through the first dielectric layer 11, a through conductor 22 penetrating through the second dielectric layer 12, and a through conductor 26 penetrating through the third dielectric layer 13. The signal output connection terminal 5a is further connected to the signal output terminal P2 via the through conductor penetrating through the fourth dielectric layer 14. The second transmission line connection terminal 5b is disposed on the upper surface of the first dielectric layer 11 and connected to a second end 3b of the second signal transmission line 3 via the through conductor penetrating through the first dielectric layer 11.

The switching element of the IC chip 6 electrically connects the signal input connection terminal 4a and the first transmission line connection terminal 4b and electrically connects the signal output connection terminal 5a and the second transmission line connection terminal 5b when the electric signal in the first frequency band at low frequency is input to the signal input terminal P1. Those terminals are electrically disconnected by the switching element of the IC chip 6 when the electric signal in the second frequency band at high frequency is input to the signal input terminal P1.

The connection state of the second signal transmission line 3 with respect to the first signal transmission line 1 is switched in accordance with the above-mentioned operations on switching the connection between the signal input connection terminal 4a and the first transmission line connection terminal 4b and the connection between the signal output connection terminal 5a and the second transmission line connection terminal 5b by the switching element of the IC chip 6. Specifically, the second signal transmission line 3 is connected in parallel to the first signal transmission line 1 between the signal input terminal P1 and the signal output terminal P2, and part of the electric signal input to the signal input terminal P1 is transmitted through the second signal transmission line 3 to the signal output terminal P2 when the switching element of the IC chip 6 connects the signal input connection terminal 4a and the first transmission line connection terminal 4b and connects the signal output connection terminal 5a and the second transmission line connection terminal 5b.

The first transmission line connection terminal 4b and the first grounding terminal 4c are connected as a pair to the switching element of the IC chip 6 and function as a pair of second switching element connection terminals. The second transmission line connection terminal 5b and the second grounding terminal 5c are connected as a pair to the switching element of the IC chip 6 and function as a pair of second switching element connection terminals.

The first grounding terminal 4c is disposed on the upper surface of the first dielectric layer 11 and connected to an external grounding conductor electrode GND1 as illustrated in FIG. 2. The second grounding terminal 5c is disposed on the upper surface of the first dielectric layer 11 and connected to an external grounding conductor electrode GND2.

The first transmission line connection terminal 4b and the first grounding terminal 4c are disconnected and the second transmission line connection terminal 5b and the second grounding terminal 5c are disconnected when the switching element of the IC chip 6 electrically connects the signal input connection terminal 4a and the first transmission line connection terminal 4b and electrically connects the signal output connection terminal 5a and the second transmission line connection terminal 5b. The first transmission line connection terminal 4b and the first grounding terminal 4c are connected and the second transmission line connection terminal 5b and the second grounding terminal 5c are connected when the switching element of the IC chip 6 electrically disconnects the signal input connection terminal 4a and the first transmission line connection terminal 4b and electrically disconnects the signal output connection terminal 5a and the second transmission line connection terminal 5b.

Figure 3:
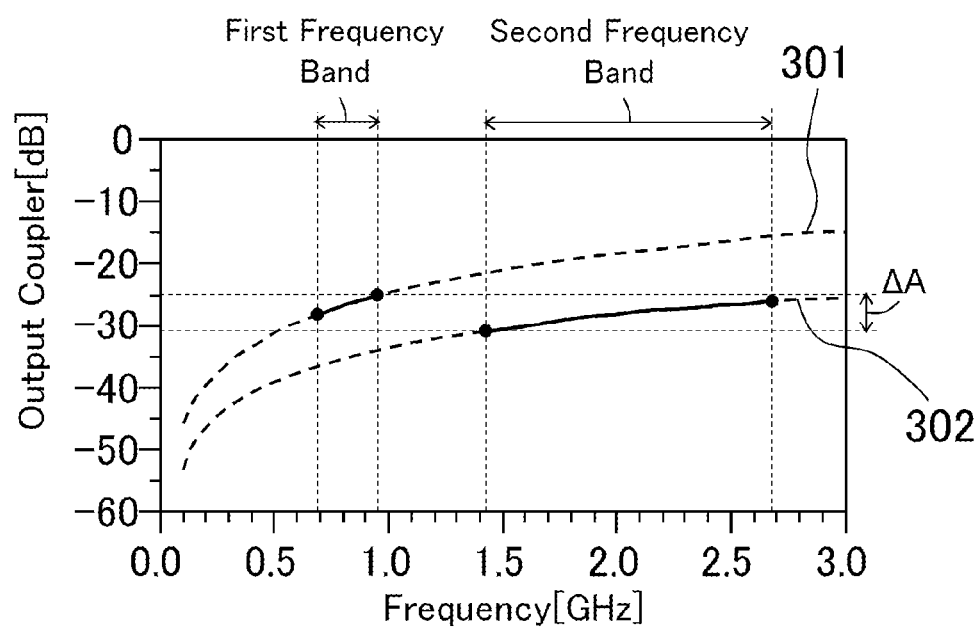
FIG. 3 is a graphic representation of a relationship between a frequency of an electric signal and a coupler output.
Figure 4:
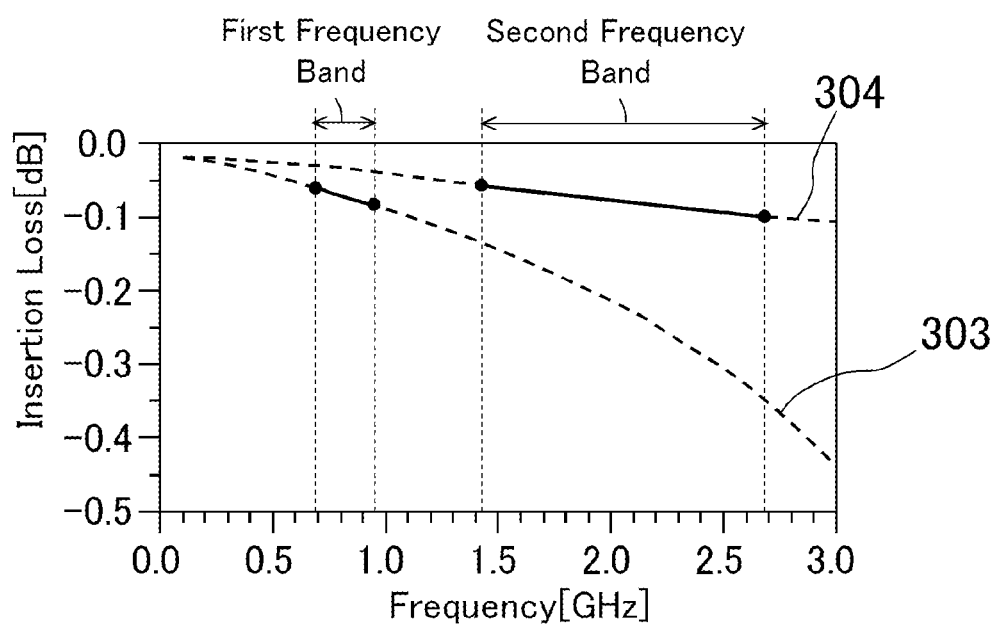
FIG. 4 is a graphic representation of a relationship between the frequency of the electric signal and an insertion loss.

FIG. 3 is a graphic representation of a relationship between a frequency of an electric signal and a coupler output, and FIG. 4 is a graphic representation of a relationship between the frequency of the electric signal and an insertion loss. FIG. 3 and FIG. 4 illustrate results obtained by modeling the directional coupler 100 according to the first embodiment and performing simulations with regard to frequency characteristics of the coupler output and the insertion loss.

An analysis is performed in a frequency band of 0.100 to 3.000 GHz. The first frequency band at low frequency of the electric signal input to the signal input terminal P1 is supposed to be 0.699 to 0.960 GHz, and the second frequency band at high frequency of the electric signal input to the signal input terminal P1 is supposed to be 1.427 to 2.690 GHz. The frequency band used by the directional coupler 100 is set as 0.699 to 2.690 GHz.

The coupler output is represented by an attenuation amount corresponding to a ratio $A_{P3}/A_{P1}$ of power ($A_{P3}$) of the electric signal output from the coupled output terminal P3 to power ($A_{P1}$) of the electric signal input to the signal input terminal P1. The insertion loss is represented by an attenuation amount corresponding to a ratio $A_{P2}/A_{P1}$ of power ($A_{P2}$) of the electric signal output from the signal output terminal P2 to the power ($A_{P1}$) of the electric signal input to the signal input terminal P1.

A line segment 301 in the graphic representation of FIG. 3 illustrating the frequency characteristics of the coupler output illustrates a relationship between the coupler output and the frequency when the switching element of the IC chip 6 connects the signal input connection terminal 4a and the first transmission line connection terminal 4b and connects the signal output connection terminal 5a and the second transmission line connection terminal 5b and the switching element of the IC chip 6 disconnects the first transmission line connection terminal 4b and the first grounding terminal 4c and disconnects the second transmission line connection terminal 5b and the second grounding terminal 5c. That is, the line segment 301 in the graphic representation of FIG. 3 illustrates the relationship between the coupler output and the frequency when the second signal transmission line 3 is connected in parallel to the first signal transmission line 1. A line segment 302 in the graphic representation of FIG. 3 illustrating the frequency characteristics of the coupler output illustrates a relationship between the coupler output and the frequency when the switching element of the IC chip 6 disconnects the signal input connection terminal 4a and the first transmission line connection terminal 4b and disconnects the signal output connection terminal 5a and the second transmission line connection terminal 5b and the switching element of the IC chip 6 connects the first transmission line connection terminal 4b and the first grounding terminal 4c and connects the second transmission line connection terminal 5b and the second grounding terminal 5c. That is, the line segment 302 in the graphic representation of FIG. 3 illustrates the relationship between the coupler output and the frequency when the second signal transmission line 3 is connected to the grounding conductor electrodes GND1 and GND2 and short-circuited.

A line segment 303 in the graphic representation of FIG. 4 illustrating the frequency characteristics of the insertion loss illustrates a relationship between the insertion loss and the frequency when the switching element of the IC chip 6 connects the signal input connection terminal 4a and the first transmission line connection terminal 4b and connects the signal output connection terminal 5a and the second transmission line connection terminal 5b and the switching element of the IC chip 6 disconnects the first transmission line connection terminal 4b and the first grounding terminal 4c and disconnects the second transmission line connection terminal 5b and the second grounding terminal 5c. That is, the line segment 303 in the graphic representation of FIG. 4 illustrates the relationship between the insertion loss and the frequency when the second signal transmission line 3 is connected in parallel to the first signal transmission line 1. A line segment 304 in the graphic representation of FIG. 4 illustrating the frequency characteristics of the insertion loss illustrates a relationship between the insertion loss and the frequency when the switching element of the IC chip 6 disconnects the signal input connection terminal 4a and the first transmission line connection terminal 4b and disconnects the signal output connection terminal 5a and the second transmission line connection terminal 5b and the switching element of the IC chip 6 connects the first transmission line connection terminal 4b and the first grounding terminal 4c and connects the second transmission line connection terminal 5b and the second grounding terminal 5c. That is, the line segment 304 in the graphic representation of FIG. 4 illustrates the relationship between the insertion loss and the frequency when the second signal transmission line 3 is connected to the grounding conductor electrodes GND1 and GND2 and short-circuited.

The switching element of the IC chip 6 connects the signal input connection terminal 4a and the first transmission line connection terminal 4b and connects the signal output connection terminal 5a and the second transmission line connection terminal 5b, and the second signal transmission line 3 is connected in parallel to the first signal transmission line 1 when the electric signal in the first frequency band at low frequency is input to the signal input terminal P1 in the directional coupler 100 according to the present embodiment. The switching element of the IC chip 6 disconnects the signal input connection terminal 4a and the first transmission line connection terminal 4b and disconnects the signal output connection terminal 5a and the second transmission line connection terminal 5b when the electric signal in the second frequency band at high frequency is input to the signal input terminal P1 in the directional coupler 100.

The directional coupler 100 according to the present embodiment is constructed as described above, and thus when the electric signal in the first frequency band at low frequency with which the electromagnetic coupling of the coupling line 2 is relatively weak is input, the second signal transmission line 3 is connected in parallel to the first signal transmission line to strengthen the electromagnetic coupling of the coupling line 2. When the electric signal in the second frequency band at high frequency with which the electromagnetic coupling of the coupling line 2 is relatively strong is input, the second signal transmission line 3 is not connected to the first signal transmission line 1, and the electromagnetic coupling of the coupling line 2 is weak. A change in the coupler output caused by the frequency can be reduced (difference AA between a minimum value and a maximum value of the coupler output can be decreased), and a change in the insertion loss can also be reduced as is clear from the graphic representation of FIG. 3 illustrating the frequency characteristics of the coupler output and the graphic representation of FIG. 4 illustrating the frequency characteristics of the insertion loss.

Capacitance may be present in the switching element of the IC chip 6 and thus a directionality of the directional coupler 100 may be decreased when the switching element of the IC chip 6 disconnects the signal input connection terminal 4a and the first transmission line connection terminal 4b and disconnects the signal output connection terminal 5a and the second transmission line connection terminal 5b. The directionality of the directional coupler 100 herein is represented by a difference between the coupler output expressed by the ratio $A_{P3}/A_{P1}$ of the power ($A_{P3}$) of the electric signal output from the coupled output terminal P3 to the power ($A_{P1}$) of the electric signal input to the signal input terminal P1 and an attenuation amount expressed by a ratio $A_{P3}/A_{P2}$ of the power ($A_{P3}$) of the electric signal output from the coupled output terminal P3 to the power ($A_{P2}$) of the electric signal output from the signal output terminal P2, that is, the difference is represented by $[A_{P3}/A_{P1}-A_{P3}/A_{P2}]$. As $[A_{P3}/A_{P1}-A_{P3}/A_{P2}]$ representing the directionality is a higher value, it is indicated that characteristics of the directionality of the directional coupler 100 are better.

In view of the above, when the electric signal in the first frequency band at low frequency is input to the signal input terminal P1 and the switching element of the IC chip 6 connects the signal input connection terminal 4a and the first transmission line connection terminal 4b and connects the signal output connection terminal 5a and the second transmission line connection terminal 5b, the first transmission line connection terminal 4b and the first grounding terminal 4c are disconnected and the second transmission line connection terminal 5b and the second grounding terminal 5c are disconnected in the directional coupler 100 according to the present embodiment. When the electric signal in the second frequency band at high frequency is input to the signal input terminal P1 and the switching element of the IC chip 6 disconnects the signal input connection terminal 4a and the first transmission line connection terminal 4b and disconnects the signal output connection terminal 5a and the second transmission line connection terminal 5b, the first transmission line connection terminal 4b and the first grounding terminal 4c are connected and the second transmission line connection terminal 5b and the second grounding terminal 5c are connected in the directional coupler 100.

The directional coupler 100 according to the present embodiment is constructed as described above, and thus when the switching element of the IC chip 6 disconnects the signal input connection terminal 4a and the first transmission line connection terminal 4b and disconnects the signal output connection terminal 5a and the second transmission line connection terminal 5b, the first transmission line connection terminal 4b and the first grounding terminal 4c are connected and the second transmission line connection terminal 5b and the second grounding terminal 5c are connected, and the second signal transmission line 3 is connected to the grounding conductor electrodes GND1 and GND2 and short-circuited. Therefore, it is possible to suppress a decrease in a coupling capacitance between the second signal transmission line 3 and the coupling line 2 and a decrease in $[A_{P3}/A_{P1}-A_{P3}/A_{P2}]$ representing the directionality, and a decrease in the directionality of the directional coupler 100 can be suppressed.

The communication module 200 according to the present embodiment is constructed by including the directional coupler 100 thus constructed that can reduce the change in the coupler output caused by the frequency and the change in the insertion loss and the IC chip 6 including the switching element mounted to the upper surface of the first dielectric layer 11 of the directional coupler 100.

The switching element of the IC chip 6 is connected to the signal input connection terminal 4a, the first transmission line connection terminal 4b, the first grounding terminal 4c, the signal output connection terminal 5a, the second transmission line connection terminal 5b, and the second grounding terminal 5c in the communication module 200.

The switching element of the IC chip 6 disconnects the first transmission line connection terminal 4b and the first grounding terminal 4c and disconnects the second transmission line connection terminal 5b and the second grounding terminal 5c, when the electric signal in the first frequency band at low frequency is input to the signal input terminal P1 and the signal input connection terminal 4a and the first transmission line connection terminal 4b are connected and the signal output connection terminal 5a and the second transmission line connection terminal 5b are connected. The switching element of the IC chip 6 disconnects the signal input connection terminal 4a and the first transmission line connection terminal 4b and disconnects the signal output connection terminal 5a and the second transmission line connection terminal 5b and connects the first transmission line connection terminal 4b and the first grounding terminal 4c and connects the second transmission line connection terminal 5b and the second grounding terminal 5c when the electric signal in the second frequency band at high frequency is input to the signal input terminal P1.

The communication module 200 includes the directional coupler 100 that can reduce the change in the coupler output caused by the frequency and the change in the insertion loss. A communication apparatus having good communication characteristics across a wide frequency band can be realized when the communication module 200 described above is mounted to the communication apparatus.

Figure 5:
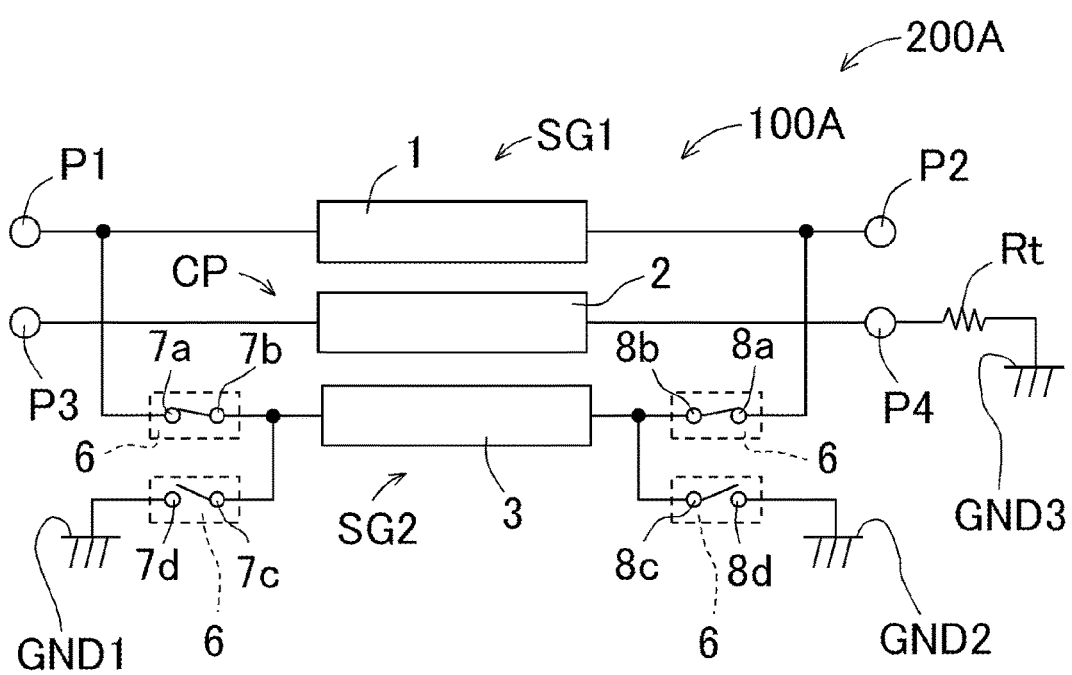
FIG. 5 is an equivalent circuit diagram of a communication module 200A including a directional coupler 100A according to a second embodiment of the present invention.

FIG. 5 is an equivalent circuit diagram of a communication module 200A including a directional coupler 100A according to a second embodiment of the present invention. The directional coupler 100A is constructed similarly to the directional coupler 100 except that configurations of switching element connection terminals in the second signal transmission unit SG2 are different from those in the second signal transmission unit SG2 described above. The communication module 200A is constructed similarly to the communication module 200 except that the communication module 200A includes the directional coupler 100A including the second signal transmission unit SG2 having the different configurations of the switching element connection terminals. The directional coupler 100A and the communication module 200A according to the present embodiment accordingly include parts similar to those of the directional coupler 100 and the communication module 200 according to the above-mentioned first embodiment. Therefore, corresponding similar parts are denoted by the same reference signs in the following explanation and drawing, and descriptions thereof will be omitted.

The second signal transmission unit SG2 of the directional coupler 100A according to the present embodiment includes a signal input connection terminal 7a, first transmission line connection terminals 7b and 7c, a first grounding terminal 7d, a signal output connection terminal 8a, second transmission line connection terminals 8b and 8c, and a second grounding terminal 8d which are switching element connection terminals connected to the switching element of the IC chip 6, and the second signal transmission line 3 between the first transmission line connection terminals 7b and 7c and the second transmission line connection terminals 8b and 8c.

The signal input connection terminal 7a and the first transmission line connection terminal 7b are connected as a pair to the switching element of the IC chip 6 and function as a pair of first switching element connection terminals. The signal output connection terminal 8a and the second transmission line connection terminal 8b are connected as a pair to the switching element of the IC chip 6 and function as a pair of the first switching element connection terminals.

The signal input connection terminal 7a is connected to the first end 1a of the first signal transmission line 1 and connected to the signal input terminal P1. The first transmission line connection terminal 7b is connected to the first end 3a of the second signal transmission line 3.

The signal output connection terminal 8a is connected to the second end 1b of the first signal transmission line 1 and connected to the signal output terminal P2. The second transmission line connection terminal 8b is connected to the second end 3b of the second signal transmission line 3.

The switching element of the IC chip 6 electrically connects the signal input connection terminal 7a and the first transmission line connection terminal 7b and electrically connects the signal output connection terminal 8a and the second transmission line connection terminal 8b when the electric signal in the first frequency band at low frequency is input to the signal input terminal P1, and those terminals are electrically disconnected by the switching element of the IC chip 6 when the electric signal in the second frequency band at high frequency is input to the signal input terminal P1.

The connection state of the second signal transmission line 3 with respect to the first signal transmission line 1 is switched in accordance with the above-mentioned operations on switching the connection between the signal input connection terminal 7a and the first transmission line connection terminal 7b and the connection between the signal output connection terminal 8a and the second transmission line connection terminal 8b by the switching element of the IC chip 6. Specifically, the second signal transmission line 3 is connected in parallel to the first signal transmission line 1 between the signal input terminal P1 and the signal output terminal P2, and part of the electric signal input to the signal input terminal P1 is transmitted through the second signal transmission line 3 to the signal output terminal P2 when the switching element of the IC chip 6 connects the signal input connection terminal 7a and the first transmission line connection terminal 7b and connects the signal output connection terminal 8a and the second transmission line connection terminal 8b.

The directional coupler 100A according to the present embodiment is constructed as described above, and thus when the electric signal in the first frequency band at low frequency with which the electromagnetic coupling of the coupling line 2 is relatively weak is input, the second signal transmission line 3 is connected in parallel to the first signal transmission line to strengthen the electromagnetic coupling of the coupling line 2. When the electric signal in the second frequency band at high frequency with which the electromagnetic coupling of the coupling line 2 is relatively strong is input, the second signal transmission line 3 is not connected to the first signal transmission line 1, and the electromagnetic coupling of the coupling line 2 is weak. Thus, the change in the coupler output caused by the frequency can be reduced, and the change in the insertion loss can also be reduced.

The first transmission line connection terminal 7c and the first grounding terminal 7d are connected as a pair to the switching element of the IC chip 6 and function as a pair of second switching element connection terminals in the directional coupler 100A according to the present embodiment. The second transmission line connection terminal 8c and the second grounding terminal 8d are connected as a pair to the switching element of the IC chip 6 and function as a pair of the second switching element connection terminals.

The first transmission line connection terminal 7c is connected to the first end 3a of the second signal transmission line 3. The second transmission line connection terminal 8c is connected to the second end 3b of the second signal transmission line 3.

The first grounding terminal 7d is connected to the external grounding conductor electrode GND1. The second grounding terminal 8d is connected to the external grounding conductor electrode GND2.

The first transmission line connection terminal 7c and the first grounding terminal 7d are disconnected and the second transmission line connection terminal 8c and the second grounding terminal 8d are disconnected when the switching element of the IC chip 6 electrically connects the signal input connection terminal 7a and the first transmission line connection terminal 7b and electrically connects the signal output connection terminal 8a and the second transmission line connection terminal 8b. The first transmission line connection terminal 7c and the first grounding terminal 7d are connected and the second transmission line connection terminal 8c and the second grounding terminal 8d are connected when the switching element of the IC chip 6 electrically disconnects the signal input connection terminal 7a and the first transmission line connection terminal 7b and electrically disconnects the signal output connection terminal 8a and the second transmission line connection terminal 8b.

The directional coupler 100A according to the present embodiment is constructed as described above, and thus when the switching element of the IC chip 6 disconnects the signal input connection terminal 7a and the first transmission line connection terminal 7b and disconnects the signal output connection terminal 8a and the second transmission line connection terminal 8b, the first transmission line connection terminal 7c and the first grounding terminal 7d are connected and the second transmission line connection terminal 8c and the second grounding terminal 8d are connected, and the second signal transmission line 3 is connected to the grounding conductor electrodes GND1 and GND2 and short-circuited. Therefore, it is possible to suppress a decrease in the coupling capacitance between the second signal transmission line 3 and the coupling line 2 and a decrease in $[A_{P3}/A_{P1} - A_{P3}/A_{P2}]$ representing the directionality, and a decrease in a directionality of the directional coupler 100A can be suppressed.

The communication module 200A according to the present embodiment is constructed by including the directional coupler 100A thus constructed that can reduce the change in the coupler output caused by the frequency and the change in the insertion loss and the IC chip 6 including the switching element.

The switching element of the IC chip 6 is connected to the signal input connection terminal 7a, the first transmission line connection terminals 7b and 7c, the first grounding terminal 7d, the signal output connection terminal 8a, the second transmission line connection terminals 8b and 8c, and the second grounding terminal 8d in the communication module 200A.

The switching element of the IC chip 6 connects the signal input connection terminal 7a and the first transmission line connection terminal 7b and connects the signal output connection terminal 8a and the second transmission line connection terminal 8b and the switching element of the IC chip 6 disconnects the first transmission line connection terminal 7c and the first grounding terminal 7d and disconnects the second transmission line connection terminal 8c and the second grounding terminal 8d when the electric signal in the first frequency band at low frequency is input to the signal input terminal P1. The switching element of the IC chip 6 disconnects the signal input connection terminal 7a and the first transmission line connection terminal 7b and disconnects the signal output connection terminal 8a and the second transmission line connection terminal 8b and the switching element of the IC chip 6 connects the first transmission line connection terminal 7c and the first grounding terminal 7d and connects the second transmission line connection terminal 8c and the second grounding terminal 8d when the electric signal in the second frequency band at high frequency is input to the signal input terminal P1.

The communication module 200A includes the directional coupler 100A that can reduce the change in the coupler output caused by the frequency and the change in the insertion loss. Thus, a communication apparatus having good communication characteristics across a wide frequency band can be realized when the communication module 200A described above is mounted to the communication apparatus.

The present invention is not limited to the above-mentioned exemplary embodiments, and various modifications may of course be added without departing from the gist of the present invention. For example, switching means using a diode or a MEMS or a mechanical switching mechanism such as a relay may be used instead of the IC chip 6. The first signal transmission line 1, the second signal transmission line 3, and the coupling line 2 may be disposed by using wiring in the IC or a rewiring layer or disposed by using a printed board or the like. Parts of the first signal transmission line 1, the second signal transmission line 3, and the coupling line 2 may be disposed on the same layer and electromagnetically coupled with one another instead of disposing the lines on mutually different layers.

REFERENCE SIGNS LIST

1 FIRST SIGNAL TRANSMISSION LINE
2 COUPLING LINE
3 SECOND SIGNAL TRANSMISSION LINE
4a, 7a SIGNAL INPUT CONNECTION TERMINAL
4b, 7b, 7c FIRST TRANSMISSION LINE CONNECTION TERMINAL
4c, 7d FIRST GROUNDING TERMINAL
5a, 8a SIGNAL OUTPUT CONNECTION TERMINAL
5b, 8b, 8c SECOND TRANSMISSION LINE CONNECTION TERMINAL
5c, 8d SECOND GROUNDING TERMINAL
6 IC CHIP
11 FIRST DIELECTRIC LAYER
12 SECOND DIELECTRIC LAYER
13 THIRD DIELECTRIC LAYER
14 FOURTH DIELECTRIC LAYER
21 to 26 THROUGH CONDUCTOR
100, 100A DIRECTIONAL COUPLER
200, 200A COMMUNICATION MODULE
CP COUPLER UNIT
P1 SIGNAL INPUT TERMINAL
P2 SIGNAL OUTPUT TERMINAL
P3 COUPLED OUTPUT TERMINAL
P4 RESISTANCE CONNECTION TERMINAL
SG1 FIRST SIGNAL TRANSMISSION UNIT
SG2 SECOND SIGNAL TRANSMISSION UNIT

The invention claimed is:

1. A directional coupler for use in a communication module comprising a switching element, the directional coupler comprising:
   a signal input terminal to which an electric signal in a predetermined first frequency band and an electric signal in a predetermined second frequency band higher than the first frequency band are input;
   a first signal transmission line through which the electric signal input to the signal input terminal is transmitted;
   a signal output terminal from which the electric signal transmitted through the first signal transmission line is output;
   a coupled line which is electromagnetically coupled to the first signal transmission line and through which an electric signal generated by being electromagnetically coupled is transmitted;
   a coupled output terminal to which a first end of the coupled line is connected and from which the electric signal transmitted through the coupled line is output;
   a resistance connection terminal which is connected to an external terminating resistance and to which a second end of the coupled line is connected; and
   a second signal transmission line disposed between the signal input terminal and the signal output terminal via the switching element and electrically connected or disconnected by the switching element,
   the second signal transmission line being electrically connected by the switching element when the electric signal in the first frequency band is input to the signal input terminal, and
   the second signal transmission line being electrically disconnected by the switching element when the electric signal in the second frequency band is input to the signal input terminal.

2. The directional coupler according to claim 1, further comprising
   a pair of first switching element connection terminals that switches electric connection or disconnection of the second signal transmission line by the switching element and comprises a first terminal connected to the signal input terminal or the signal output terminal and a second terminal connected to the second signal transmission line,
   wherein the switching element electrically connects the first terminal and the second terminal of the pair of first switching element connection terminals when the electric signal in the first frequency band is input to the signal input terminal, and
   wherein the switching element electrically disconnects the first terminal and the second terminal of the pair of first switching element connection terminals when the electric signal in the second frequency band is input to the signal input terminal.

3. The directional coupler according to claim 2, further comprising
a pair of second switching element connection terminals that is connected to the switching element and comprises a first terminal connected to the second signal transmission line and a second terminal connected to ground,
wherein the first terminal and the second terminal of the pair of second switching element connection terminals are disconnected when the switching element electrically connects the first terminal and the second terminal of the pair of first switching element connection terminals, and
wherein the first terminal and the second terminal of the pair of second switching element connection terminals are connected when the switching element electrically disconnects the first terminal and the second terminal of the pair of first switching element connection terminals.

4. The directional coupler according to claim 1, wherein
the first frequency band is 0.699 to 0.960 GHz, and
the second frequency band is 1.427 to 2.690 GHz.

5. A communication module comprising:
the directional coupler according to claim 1; and
a switching element that is disposed on the second signal transmission line and connects or disconnects the second signal transmission line,
the switching element electrically connecting the second signal transmission line when the electric signal in the first frequency band is input to the signal input terminal, and
the switching element electrically disconnecting the second signal transmission line when the electric signal in the second frequency band is input to the signal input terminal.

6. The directional coupler according to claim 2, wherein
the first frequency band is 0.699 to 0.960 GHz, and
the second frequency band is 1.427 to 2.690 GHz.

7. The directional coupler according to claim 3, wherein
the first frequency band is 0.699 to 0.960 GHz, and
the second frequency band is 1.427 to 2.690 GHz.

8. A communication module comprising:
the directional coupler according to claim 2; and
a switching element that is disposed on the second signal transmission line and connects or disconnects the second signal transmission line,
the switching element electrically connecting the second signal transmission line when the electric signal in the first frequency band is input to the signal input terminal, and
the switching element electrically disconnecting the second signal transmission line when the electric signal in the second frequency band is input to the signal input terminal.

9. A communication module comprising:
the directional coupler according to claim 3; and
a switching element that is disposed on the second signal transmission line and connects or disconnects the second signal transmission line,
the switching element electrically connecting the second signal transmission line when the electric signal in the first frequency band is input to the signal input terminal, and
the switching element electrically disconnecting the second signal transmission line when the electric signal in the second frequency band is input to the signal input terminal.

10. A communication module comprising:
the directional coupler according to claim 4; and
a switching element that is disposed on the second signal transmission line and connects or disconnects the second signal transmission line,
the switching element electrically connecting the second signal transmission line when the electric signal in the first frequency band is input to the signal input terminal, and
the switching element electrically disconnecting the second signal transmission line when the electric signal in the second frequency band is input to the signal input terminal.

11. A communication module comprising:
the directional coupler according to claim 6; and
a switching element that is disposed on the second signal transmission line and connects or disconnects the second signal transmission line,
the switching element electrically connecting the second signal transmission line when the electric signal in the first frequency band is input to the signal input terminal, and
the switching element electrically disconnecting the second signal transmission line when the electric signal in the second frequency band is input to the signal input terminal.

12. A communication module comprising:
the directional coupler according to claim 7; and
a switching element that is disposed on the second signal transmission line and connects or disconnects the second signal transmission line,
the switching element electrically connecting the second signal transmission line when the electric signal in the first frequency band is input to the signal input terminal, and
the switching element electrically disconnecting the second signal transmission line when the electric signal in the second frequency band is input to the signal input terminal.

* * * * *